July 28, 1942.    S. B. MARTIN    2,291,398
COLLET
Filed Nov. 20, 1939    2 Sheets-Sheet 1

INVENTOR.
STODDARD B. MARTIN
BY Richey & Watts
ATTORNEYS

July 28, 1942.  S. B. MARTIN  2,291,398
COLLET
Filed Nov. 20, 1939   2 Sheets-Sheet 2

INVENTOR.
STODDARD B. MARTIN
BY Richey & Watts
ATTORNEYS

Patented July 28, 1942

2,291,398

UNITED STATES PATENT OFFICE 2,291,398

COLLET

Stoddard B. Martin, Lakewood, Ohio

Application November 20, 1939, Serial No. 305,295
In France November 30, 1938

14 Claims. (Cl. 279—51)

This invention relates to improvements in collets, and more particularly to collets of the type used in automatic screw machines to hold the stock being worked upon.

In many automatic screw machines, a relatively long piece of stock is intermittently advanced a predetermined distance through a work-holding chuck or collet which holds the stock securely during the period when the cutting or machine tools are performing an operation upon the stock, and releases the stock at the proper time to permit it to be advanced by the feeding mechanism. Although the present invention is described with collets for automatic screw machines, it is in no sense restricted to such use since the collet is readily adapted for other types of machines such as drill presses or the like.

Heretofore, in some particular machines, when it was desired to operate on stock of different size, it was often necessary to dismantle the work holding assembly and insert a new collet adapted to hold the work of that particular size. This necessitated a loss of time of the machine as well as effort by the workman for the period during which the machine was laid up to permit such changes.

The present invention is an improvement over that covered by my Patent No. 2,155,019 of April 18, 1939, and also embodies inventions claimed more broadly in my copending application Serial No. 208,643, original filed November 23, 1936.

By the present invention it becomes unnecessary to dismantle the stock feeding apparatus or change the body of the collet in the event work of different diameters is to be fed through the collet. My improved collet is quickly and easily adapted to satisfactorily grip work of different diameters.

The principal object of this invention is to obtain at the same time the advantages of separable work gripping pads carrying holding means for securing the pads to the collet body so that the pads and holding means are movable and replaceable as units and the advantages of facility of removal and replacement of the pads and the self-cleaning action which results from the holding means on the pads entering recesses cut in from the front face of the collet. Other objects are to lock the pads securely against circumferential or axial movement and hold them against radial movement while permitting the pads to be pressed radially outward by the work engaging pressure without loosening the holding means in the collet, and to combine these advantages with the advantages of pads which carry their own holding means and in which the holding means enter recesses extending in from the front face of the collet.

Another object of my invention is to provide a collet whereby the change from one stock size to another is effected by changing the stock gripping pads which are adapted to be removed axially from the collet through the forward face of the collet.

It is a further object of my invention to provide a collet having slots or grooves in its forward face adapted to slidably receive and hold interchangeable stock gripping pads carrying their own holding means.

It is another object of my invention to provide work-gripping pads having portions thereof adapted to be disposed in the aforesaid slots or grooves for securing the pads in place in the collet.

Another object of the invention resides in providing a collet with interchangeable work-gripping pads which has advantages relating to simplicity of construction and economies of manufacture; these and other objects of the invention will become apparent from the following description and the appended drawings, wherein.

Figure 1:
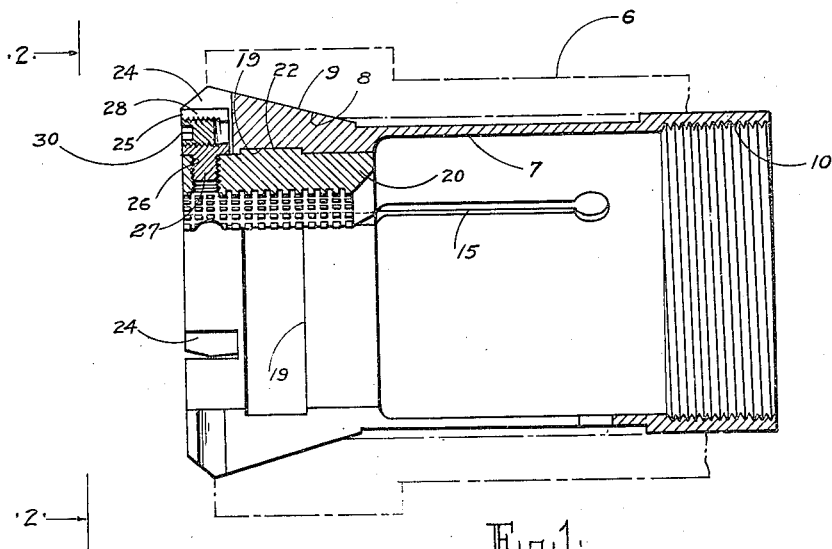
Fig. 1 is a longitudinal sectional view of the collet constructed according to my invention taken on the line 1—1 of Fig. 2.

I have illustrated my invention as applied to a collet used in an automatic screw machine. A spindle for the screw machine is indicated by the dot-dash line at 6 and is adapted to be rotatably supported in the head frame of the machine. The collet body 7 is telescopically disposed within the spindle 6 and is provided with a cam 9 arranged to bear against the cam portion 8 of the spindle to effect reduction of diameter across the forward end of the collet body and to provide a stock gripping action. The desired flexibility for the forward portion of the collet body is provided by slots 15 which extend longitudinally from the face of the collet into the body spaced from the end and which divide the forward end of the body into flexible segments. The inner end of the collet body is threaded as at 10 for cooperation with the draw tube which pulls the collet body into the spindle 6 in a well known manner. Although the invention is illustrated and described as used in connection with the pull-in type of collet, it will be obvious that the invention is not limited to that type alone, but may be used with others such as the push-out type.

The forward or exposed end of the collet body is provided with a plurality of segmental stock gripping pads 20 arranged to grip the stock which is intermittently advanced through the collet. The peripheries of the stock gripping pads are provided with annular ribs 22 arranged to seat in an annular groove 19 within the collet body. The pads 20 are interchangeable and may be formed of hardened tool steel of differing metal characteristics than the body of the collet. The inner surface of the pad may be knurled or roughened as best shown in Fig. 1 to provide a better grip of the stock during the working thereof.

Figures 2, 3:
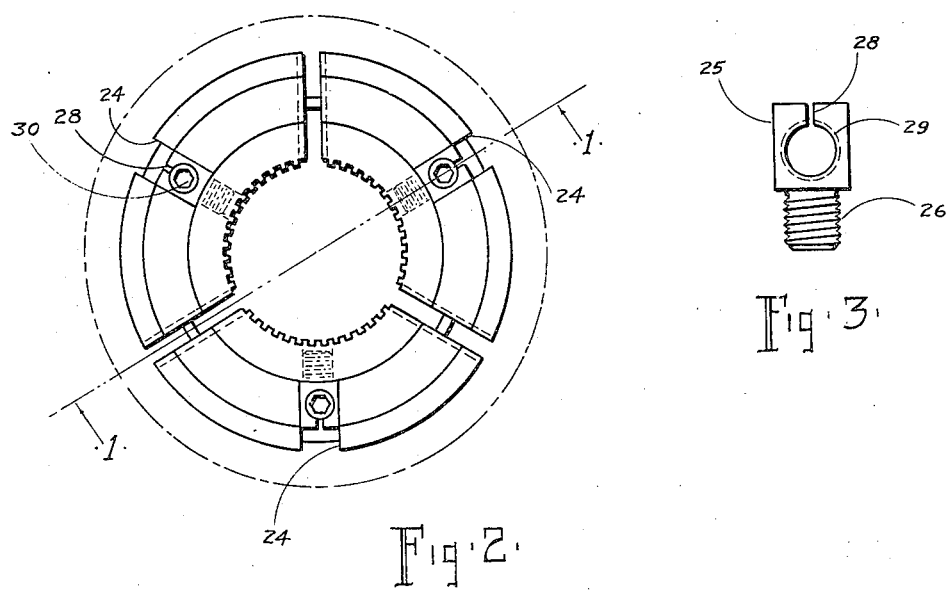
Figure 2 is a front elevation of the collet shown in Figure 1.
Figure 3 is an elevation of one of the securing studs removed from its pad.

The forward or exposed face of the body of the solid collet segment is grooved as at 24 to receive or hold the pad securing devices, each of which may comprise a stud 25 having a threaded stem 26 which is screw threaded into a radially extending opening 27 near the end face of the pad in the midsection thereof. The body of each stud 25 as shown in Figs. 1 to 3 is split longitudinally as at 28 by a kerf and is formed with a tapped opening 29 extending inwardly from the front face substantially parallel to the axis of the collet body and intersecting the kerf 28. Wedge-shaped set screws 30 are screwed into the tapped openings in the posts 25 causing the body parts on opposite sides of the kerf to be forced into engagement with the walls of grooves 24. Inasmuch as the posts are rendered resilient by the kerfs 28, the screws are normally gripped and held in the posts even when the pad is removed from the collet.

Each pad 20 with its post or stud 25 and screw 30 assembled therein, may be assembled in position in the collet body by inserting the pad into the body with the stud in alignment with the groove 24 and with the annular rib 22 opposite the groove 19. The pad is then moved radially outward until the rib engages in the groove 19. The rib having been engaged in the groove 19, the tapered set screw is screwed into the threaded opening 29 which expands the body, as previously stated, until the walls of the stud securely engages the sides of the grooves 24 locking the pad securely in place.

Changing the pads may be quickly and easily accomplished by loosening the screws 30, so that the walls of the posts 25 are disengaged from the sides of the grooves 24, and then move the pads inwardly to disengage the rib 22 from the groove 19, after which the pads may be withdrawn from the face of the collet.

This device thus has an advantage that the securing means are normally carried by the pads and it is unnecessary to mount any form of securing means in the collet itself. Pads of varying inside diameter may thus be quickly substituted in the collet to allow the collet to grip various sizes of stock without disconnecting the collet from the machine. Inasmuch as the screws 30 are held in position in the studs when the pads are removed by the tension of the split portions of the posts 25, there is no danger of losing them. A further advantage of this arrangement is that the screws 30 which are ordinarily hardened do not directly engage the collet body which is necessarily hardened material. The posts 25 may be made of any suitable softer material so that a uniform and widely distributed bearing is obtained between the screws and the posts and between the posts and the walls of the grooves 24 of the collet.

During operation, it will be observed that the walls of the groove 19 being interlocked with the annular ribs 22 of the work-holding pad, all axial loads are transmitted directly from the working pads to the collet and that the members 25 function to maintain said working position of the pads. Likewise the radial gripping loads are directly transmitted from the pads to the inner surface of the collet and the pads are free to be pressed outwardly against the collet body by the working loads without injuring the holding means or loosening the grip of the members 25 in the grooves 24. It will also be observed that the construction is such that the centrifugal forces occasioned by the collet rotation will not tend to disturb the working position of the work-holding pads or their associated holding members. It will further be noted that inasmuch as the locking screw is secured to the pad rather than the collet, considerably greater ease in removing the collet is attained because the collet only need be moved inwardly radially a sufficient distance to disengage the rib 22 from the groove 19.

Figure 9:
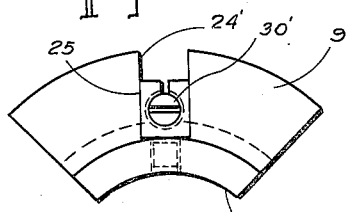
Figure 9 is a front elevation of a portion of the collet shown in Figure 8.
Figure 8:
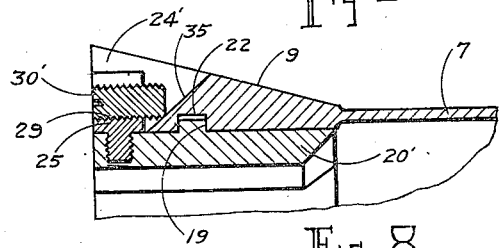
Figure 8 is a detail sectional view through a collet showing a further modified securing means for the pad.

In Figs. 8 and 9 I have shown a similar arrangement where the pad 20' is adapted for locking engagement by means of the ribs 22 and grooves 19. In this instance; however, the groove 24' which corresponds to the groove 24 of the device of Fig. 1, instead of being provided with a bottom wall in a plane normal to the axis of the collet, is provided with a wall 35 extending at an angle to the axis. The set screw 30' extends through the threaded opening 29 and is adapted to exert a cam action against the end wall 35 which when the screw is tightened, pulls the pad securely into contact with the body of the collet.

Figure 10:
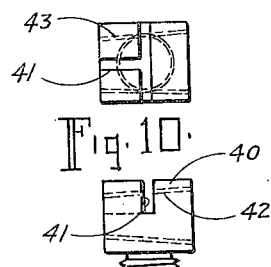
Figure 10 is a top plan view of a modified form of securing stud removed from the pad.
Figure 11:
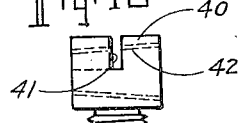
Figure 11 is a side elevation of the stud shown in Figure 10.

Figs. 10 and 11 illustrate in plan and side elevation a modified form of fastening device which may be substituted for that of Figs. 8 and 9 wherein the body 40 is provided with a T-shaped slot 41 with the stem of the T extending through the end of the stud remote from the face of the collet. In this instance the threaded opening 42 is tapered, the smaller end of the opening being to the rear, such that when the screw is threaded into the device the portions 43 on either side of the stem of the T-shaped slot are spread outwardly to engage the side walls of the grooves 24 adjacent the rear of the groove. The screw may extend on through the body and engage the wall 35 in the manner described for Figs. 8 and 9 providing a three point contact for the stud and screw with the collet.

Figure 12:
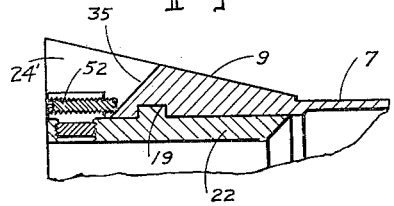
Figure 12 is a detail sectional view through a collet showing a further modification of the securing means.
Figure 14:
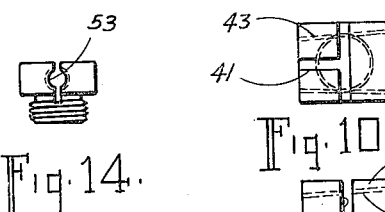
Fig. 14 is an end elevational view of the holding device shown in Figures 12 and 13 removed from the pad.
Figure 13:
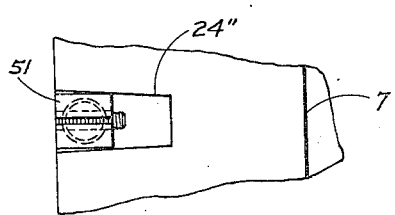
Figure 13 is a top plan view of the collet shown in Figure 12.

Figs. 12, 13, and 14 show a device operating in a manner similar to that of Figs. 8 and 9. In this device, the holding action of the stud is concentrated at three points. The groove 24'', instead of being provided with parallel sides, is provided with tapered sides, as best shown in Fig. 13, the spacing being smallest at the rear of the groove. The tapered screw 52 is screwed through the opening 53 of the stud and engages the slanting back wall 35. The body of the stud engages the sides of the groove 24'' spaced from the forward face of the collet.

Figure 5:
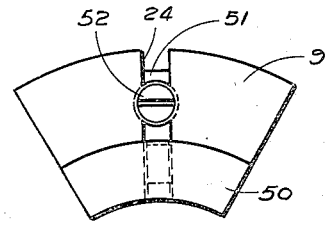
Figure 5 is a front elevation of a portion of the collet shown in Figure 4.
Figure 4:
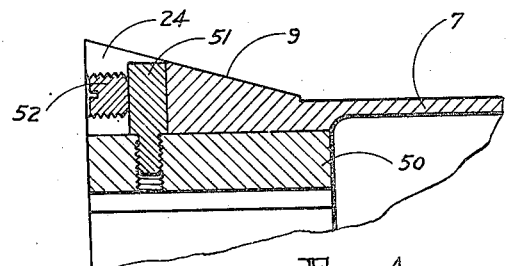
Figure 4 is a detail sectional view through a collet showing a different type of securing means.

In Figs. 4 and 5 I have shown another modification of my invention. In this instance the pad 50 is provided with a stud 51 screw threaded into the body of the pad as in the other embodiments. The body of the stud, however, is solid and of square cross section, being substantially a rectangular parallelepipedon and is adapted to bottom in the groove 24 and be held securely in place by a set screw 52 which is threaded into an axially extending opening intersecting the slot 24.

In this modification the device may be removed by removing the set screw 52 from the threaded opening, after which the pad may be removed in the manner previously described. After the first pad is removed it may be unnecessary to take the set screws out for the remaining pads, since the pads can be moved radially inward until the studs are beyond the point of engagement of the screw 52 in the slot.

Figure 7:
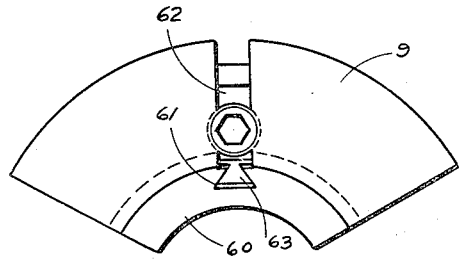
Figure 7 is a front elevation of a portion of the collet shown in Figure 6.
Figure 6:
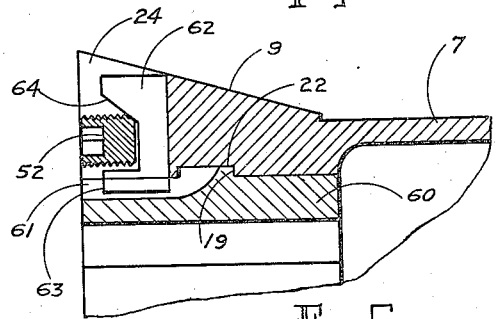
Figure 6 is a detail sectional view through a collet showing a further modified securing means for the pad.

In Figs. 6 and 7 I have shown another modification of my invention somewhat similar to that of Fig. 4 except that the pad 60 in this instance is provided with a longitudinally extending wedge shaped groove 61 in its outer or collet segment engaging surface, and in which the holding device 62 is secured by a complementary tongue 63 providing a sliding dove-tail connection therewith. The body of the holding device or stud is provided with a slanting wall 64 against which the end of the screw 52 engages, exerting a cam action against the holding device which is transmitted to the pad through the dove-tail connection and thus securely holds the pad in position. In this instance it is merely necessary to loosen the set screw sufficiently to allow the rib 22 to disengage from the groove 19 in the collet, after which the pad may be slid inwardly and disengage from the dove-tail connection and removed through the end of the collet.

Preferably the holes for the set-screws 52 in the embodiments of Figs. 4 and 6 would be drilled and tapped in the end of the collet before the slots 24 are milled therein. It will also be seen that in the device of Fig. 6 the pad can be removed in the same manner as in Fig. 4 if desired by removing the set-screws entirely from the face of the collet and sliding the pad inwardly to disengage the rib and groove 22 and 19 and then advance the pad outwardly through the end of the collet.

It will thus be seen, that among the advantages of my construction arrangement, it becomes unnecessary to carry in stock a large number of collets which are expensive to make and maintain. According to my invention, it is only necessary to provide a plurality of various size work holding pads, and such pads may be economically formed of the type of steel which would be unsuited or uneconomical if applied to the entire collet body. For instance, the collet body may be formed of a relatively inexpensive machineable stock suited to take tension and loads to which it may be subjected, and the work holding pads may be formed of a high grade wear-resisting tool steel particularly suited to the repeated stresses of releasing and holding the advancing stock.

Although I have described my invention as used in connection with an automatic screw machine, it will be appreciated that the invention is applicable to other work holding or chucking assemblies. It will also be understood that whereas I have described some embodiments of my invention in considerable detail, numerous modifications may be made therein by those skilled in the art without departing from the scope of the invention as defined by the following claims.

I claim:

1. A work holding collet comprising a hollow tubular body having slots extending axially inward from its front face to provide a plurality of resilient segments adapted to be forced inwardly to grip work, said segments having openings extending axially inward from their front faces and communicating radially with the interior of said hollow body, separate work gripping pads mounted on the inner side of said resilient segments, and each having an outwardly extending expandable projection disposed within one of said openings, and means to expand said projection to secure said projection within said opening, said means being accessible for manipulation from the front face of the collet.

2. A work holding collet comprising a hollow tubular body provided with a plurality of work holding resilient segments, said segments having openings extending inward from the front face of the collet in each segment, work holding pads mounted on the inner surface of each work holding segment and each pad having an outwardly extending projection engageable in one of said openings, each of said projections being formed to be expandable and contractable to engage the sides of said openings, and means operable from the face of the collet to expand and contract said projection to engage and disengage said projection from the sides of said openings.

3. A work holding collet comprising a hollow tubular body provided with a plurality of work holding resilient segments, said segments having openings extending inward from the front face of the collet in each segment, work holding pads mounted on the inner surface of each work holding segment and each pad having an outwardly extending projection engageable in said openings, each of said projections being formed to be expandable and contractable to engage the sides of said openings, and means carried by the projection operable from the front face of the collet to expand and contract said projections to engage and disengage said projection from the sides of said opening.

4. A work holding collet comprising a hollow tubular body, the front end of said body being thickened and formed with slots extending axially inward through the thickened portion and into the body to provide a plurality of resilient segments, said segments being formed with parallel walled openings extending axially into the segments and opening through the segment, removable work gripping pads for said segments, each adapted for engagement with the inner face of a segment and having a stud for the pad comprising a threaded supporting stem adapted for threaded engagement in the pad, a body having side walls for engagement with the walls of the opening, the extremity of the body being slotted and a threaded opening intersecting the slot, a screw for threaded engagement in the threaded opening for moving the walls of the body outward against the walls of the opening in the collet to hold the pad in work-holding position.

5. A work holding collet comprising a hollow tubular body, said body having an increasing wall thickness toward its forward face and formed with slots extending axially inward from the front face to divide the body into a plurality of resilient segments, said segments being provided with openings extending inward from the front face and terminating in a back wall extending at an acute angle to the axis of the collet, work holding pads for detachable engagement with the inner faces of the segments including curved bodies having an inner work holding face, means to hold each pad in engagement with a segment comprising a stud secured to the pad and having an outwardly extending laterally expandable body for slidable engagement in the openings in the collet segments, means for engaging the stud and the back wall of the opening to expand the stud and exert a camming action with the back wall to hold the pad in the segment.

6. A work holding collet comprising a hollow tubular body, said body having an increasing wall thickness toward its forward face and formed with slots extending axially inward from the front face to divide the body into a plurality of resilient segments, said segments being provided with openings extending inward from the front face and terminating in a back wall extending at an acute angle to the axis of the collet, work holding pads for detachable engagement with the inner faces of the segments including curved bodies having an inner work holding face, means to hold each pad in engagement with a segment comprising a stud secured to the pad and having an outwardly extending radially split body for slidable engagement in the openings in the collet segments, means for engaging the stud and the back wall of the opening to exert a camming action against the back wall to hold the pad in the segment, comprising a screw threaded axially through the stud body.

7. A work holding collet comprising a hollow tubular body, said body having an increasing wall thickness toward its forward face and formed with slots extending axially inward from the front face to divide the body into a plurality of resilient segments, said segments being provided with openings extending inward from the front face and terminating in a back wall extending at an acute angle to the axis of the collet, work holding pads for detachable engagement with the inner faces of the segments including curved bodies having an inner work-holding face, means to hold each pad in engagement with a segment comprising a stud secured to the pad and having parallel walls for close fitting engagement with the walls of said opening and provided with a threaded opening extending axially through the body, said body provided with an axially extending kerf to allow the body to expand, and a screw for threaded engagement in the opening in the body to expand the walls of the stud into engagement with the walls of the opening and adapted to extend through the stud body and engage said slanting rear wall to pull the stud and pad outwardly into engagement with the segment.

8. A work holding collet comprising a hollow tubular body having a front face, said front face provided with slots extending axially inward therefrom to provide a plurality of resilient segments adapted to be forced inwardly to grip work, said segments being formed with openings extending axially inward from the front faces and communicating radially with the interior of said hollow body, separate pads mounted on the inner side of said resilient segments for gripping the work, each pad having an outwardly extending stud extending within one of said openings, each stud being bifurcated and provided with a threaded opening extending axially of the collet and intersecting said bifurcation, a tapered threaded member adapted to be screwed into said threaded opening to spread said bifurcated portion apart and force them into engagement with the walls of said opening and lock said pad to said segment.

9. A work holding collet comprising a hollow tubular body formed with slots extending axially inward from its front face to provide a plurality of resilient segments adapted to be forced inwardly to grip work, said segments being formed with openings extending axially inward from the front faces communicating radially with the interior of said hollow body and with recesses extending around the inner surface of each segment, separate work gripping pads for said segments formed with complementary faces for engagement with the inner side of said resilient segments, each pad having an outwardly extending projection secured thereto, each of said projections being bifurcated at its outer extremity and provided with a threaded opening extending parallel to the axis of the collet and intersecting said bifurcation, a threaded setscrew adapted to be threaded into the opening to force apart the walls of said projection and into engagement with the walls of said opening to lock said pad to said segment.

10. A work holding collet comprising a hollow tubular body, the front end of said body being thickened and formed with slots extending axially inward through the thickened portion and into the body to provide a plurality of resilient segments adapted to be forced inwardly to grip the work, said segments being formed with parallel walled openings extending axially into the segments and opening through the segments, removable work gripping pads for said segments, each adapted for engagement with the inner face of a segment and having radially extending bifurcated studs, each stud providing a sliding fit within said opening and means engaging the studs to expand the stud to lock the stud in the opening and hold the pad against the segment.

11. A work holding collet comprising a hollow tubular body, the front end of said body being thickened and formed with slots extending axially inward through the thickened portion and into the body to provide a plurality of resilient segments adapted to be forced inwardly to grip the work, said segments being formed with parallel walled openings extending axially into the segments and opening through the segment, removable work gripping pads for said segments, each adapted for engagement with the inner face of a segment and having radially extending studs, each stud having a body in the form of a substantially right angled parallelepipedon having walls for engagement with the walls of the segment groove, said body being formed with a kerf extending longitudinally into the body from the end at the forward face of the collet and coaxial with the collet axis into a second kerf extending in a plane normal to the first and spaced from the end remote from the forward face of the collet and a threaded opening extending axially through the body and intersecting said kerf, a screw adapted to be threaded through said threaded opening in the body to expand the first kerf and force the body portion at the forward end of the body into engagement with the side walls of the collet opening.

12. A master collet including a plurality of resilient jaws, said collet having an opening extending axially inward from its front face and communicating radially with the interior of the collet, a stock gripping pad carried by said collet, and means removably securing said pad to said collet including a laterally expandible member extending outwardly from said pad, said member fitting within and being expanded laterally into gripping relation with the walls of said opening.

13. A master collet including a plurality of resilient jaws, said collet having a slot extending axially inward from its front face and communicating radially with the interior of the collet, a stock gripping pad carried by said collet, and means removably securing said pad to said collet including a laterally expandable split post extending outwardly from said pad and fitting within said solt, and an axially extending screw threaded into said split post to expand the same into gripping relation with the walls of said slot.

14. A master collet including a plurality of resilient jaws, said jaws having slots extending axially inward from their front faces and communicating radially with the interior of said collet, a stock gripping pad carried by each of said jaws, each of said pads having an outwardly extending split post fitting within one of said slots, and a screw threaded into each of said posts and accessible from the front face of the collet for manipulation to secure or release the pad, each of said pads with its post and screw being removable and replaceable as a unit.

STODDARD B. MARTIN.